(12) United States Patent
Lees

(10) Patent No.: US 6,264,284 B1
(45) Date of Patent: Jul. 24, 2001

(54) WHEEL NUT ASSEMBLY

(75) Inventor: John Sydney Lees, Walsall (GB)

(73) Assignee: Wheelsure Limited (GB)

( * ) Notice: Subject to any disclaimer, the term of this patent is extended or adjusted under 35 U.S.C. 154(b) by 0 days.

(21) Appl. No.: 09/355,376

(22) PCT Filed: Jan. 23, 1998

(86) PCT No.: PCT/GB98/00212

§ 371 Date: Oct. 4, 1999

§ 102(e) Date: Oct. 4, 1999

(87) PCT Pub. No.: WO98/32617

PCT Pub. Date: Jul. 30, 1998

(30) Foreign Application Priority Data

Jan. 24, 1997 (GB) .................................................. 9701533

(51) Int. Cl.[7] .............................. B60B 1/00; F16B 37/14
(52) U.S. Cl. ....................................... 301/35.62; 411/431
(58) Field of Search ........................... 301/35.62, 37.37, 301/108.4; 411/431, 429, 372.5, 372.6, 374

(56) References Cited

U.S. PATENT DOCUMENTS

| 4,223,799 | * | 9/1980 | Eyster et al. | 220/230 |
| 4,824,305 | * | 4/1989 | McCauley | 411/431 |
| 5,205,614 | * | 4/1993 | Wright | 301/37.37 |
| 5,222,785 | * | 6/1993 | Green | 301/37.37 |
| 5,294,189 | * | 3/1994 | Price et al. | 301/37.37 |
| 5,503,465 | * | 4/1996 | Price et al. | 301/37.37 |
| 5,667,281 | * | 9/1997 | Ladouceur | 301/37.37 |
| 5,752,794 | * | 5/1998 | Krawczak | 301/37.37 |
| 5,842,749 | * | 12/1998 | DiMarco | 301/37.37 |
| 6,030,049 | * | 2/2000 | Russell | 301/37.37 |
| 6,053,681 | * | 4/2000 | Mattershead | 411/372.5 |
| 6,053,683 | * | 4/2000 | Cabiran | 411/431 |
| 6,070,947 | * | 6/2000 | Hoyle, Jr. | 301/37.37 |
| 6,126,355 | * | 10/2000 | Clover, Jr. | 411/374 |

FOREIGN PATENT DOCUMENTS

| 2 101 837 | 2/1995 | (CA) . |
| 0 253 496 | 1/1988 | (EP) . |
| 2 531 155 | 2/1984 | (FR) . |
| 96 23142 | 8/1996 | (WO) . |

OTHER PUBLICATIONS

Professional Engineering, p. 22, vol. 7, No. 18, Oct. 1994.

* cited by examiner

Primary Examiner—S. Joseph Morano
Assistant Examiner—Long Bao Nguyen
(74) Attorney, Agent, or Firm—Christensen O'Connor Johnson Kindness PLLC

(57) ABSTRACT

A wheel nut assembly is disclosed in which a wheel stud (1) is provided which comprises a first portion having a first external thread (3) adapted to cooperate with an internal thread on a wheel nut (4), and a second threaded portion (5) having a thread (6) of the opposite hand to the first external thread (3) which cooperates with a retaining member (9) having a thread (10) which is of the same hand as the second threaded portion. The retaining member (9) may be a bolt which engages a threaded bore provided in the end of a standard stud. A locking cap (12) may be provided which fits over the wheel nut (4) and the bolt (9) to prevent relative rotation between the two. This has the advantage of preventing the wheel nuts becoming loose on the wheel.

19 Claims, 7 Drawing Sheets

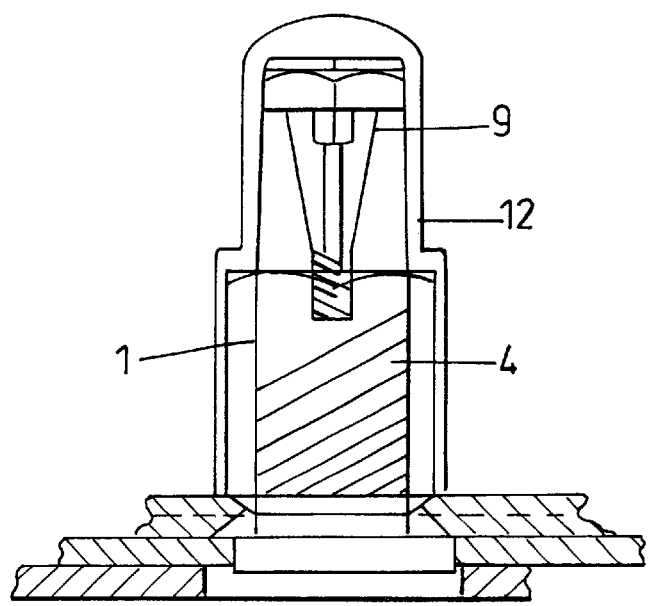
*Fig. 2*
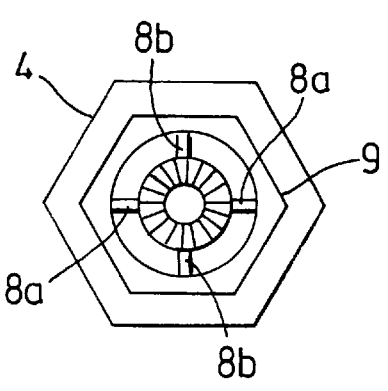 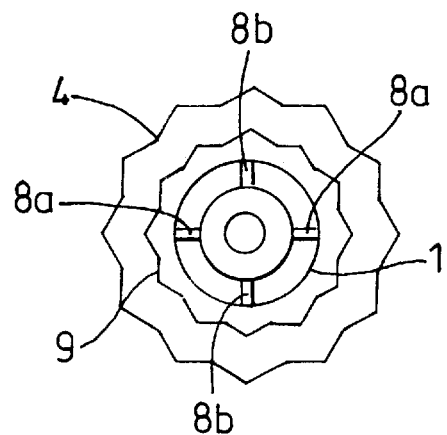
*Fig. 3(A)*        *Fig. 3(B)*

WHEEL NUT ASSEMBLY

This is a U.S. national stage application of International application No. PCT/GB98/00212, filed Jan. 23, 1998, the benefit of the filing date of which is hereby claimed under 35 U.S.C. §120, which in turn claims the benefit of British application No. 9701533.3, filed Jan. 24, 1997, the benefit of the filing date of which is hereby claimed under 35 U.S.C. §119.

This invention relates to improvements in a method and apparatus for mounting and retaining a wheel onto a hub, and in particular relates to fixings for vehicle wheels.

It is known to fix a wheel onto a vehicle hub using a plurality of wheel studs which are fixed to the hub and a plurality of wheel nuts with one nut provided for each stud. The studs have an external threaded portion which is adapted to co-operate with a corresponding internal threaded portion of the wheel nut. Such a wheel nut assembly will hereinafter be referred to as being of the kind set forth, and is illustrated in FIG. 6.

Modern vehicle wheels, especially those for use on commercial vehicles, comprise a rim portion and a nave or wheel disc. The nave joins the rim to the wheel centre, and is welded to the rim. Alternatively, one piece wheels are sometimes employed in which the rim and the nave are integral parts. To assemble the wheel to the vehicle hub, the wheel is first positioned so that the wheel is concentric with the hub and the wheel studs project through openings in the nave or disc. The wheel nuts are then tightened onto the studs. Because the nuts are of a larger diameter than the openings through which the studs are passed, the wheel is firmly clamped in place, by the nut against the hub.

Whilst the wheel nut assembly of the kind set forth is widely used to mount wheels on vehicles, there is a serious problem with the nuts working loose. In a worst case, if all the nuts work loose, the wheel can release itself from the hub with potentially catastrophic results. In practice, even if only one of the nuts retaining a wheel is loose, this will place extra loading on the adjacent nuts which causes them to start to work loose. It is not unknown for a whole wheel to work free within 20 minutes of a single nut starting to vibrate loose.

In accordance with a first aspect of the invention, we provide a wheel nut assembly of the kind set forth in which: the wheel stud comprises a first portion having a first external thread which is adapted to co-operate with an internal thread provided on the wheel nut, and a second threaded portion having a thread of the opposite hand to the first external thread which co-operates with a retaining member having a thread which is of the same hand as the second threaded portion.

Preferably, a locking means can be provided which is adapted to substantially prevent relative rotational movement between said wheel nut and said retaining member.

Thus, when the wheel is mounted onto the vehicle with the wheel nut screwed into position on the stud, the retaining member screwed into position on the stud and the locking means is fitted, any tendency for the wheel nut to rotate loose will cause the retaining member to tighten. Since the locking member prevents relative movement between the retaining member and the wheel nut, the nut cannot therefore work loose as it is prevented from doing so by the increasing resistance of the retaining member as it is tightened.

Preferably, the retaining member comprises a threaded bolt, for example a thrust bolt, and the stud is provided with an internal bore which defines the second threaded portion.

Most preferably, the retaining member has an external diameter greater than the internal diameter of the wheel nut. Thus, as the wheel nut starts to work loose, it is ultimately prevented from movement axially along the stud by the threaded bolt. The outer diameter of the wheel nut and the outer diameter of the head of the threaded bolt are preferably substantially the same.

The thread on the retaining member may have a pitch which is greater than the pitch of the first thread on the wheel nut.

The locking means may comprise a locking cap which may completely enclose the wheel nut and the retaining member. This helps prevent dirt and grime from entering the assembly, and can help to prevent rust forming on any exposed surfaces.

The locking means may be provided with a fastening means adapted to retain it onto either the stud and/or the wheel nut and/or the retaining member. This could prevent unauthorised removal of the wheel nuts as well as preventing the locking member from falling off accidentally. This may comprise a magnet which may be mounted into an inner face of the cap.

The shape of the wheel nut and the retaining member may be adapted so that the locking member can only be put in position once the nut and retaining member are tightened to substantially the correct torque.

In a preferred arrangement, an axial space is provided between the head of the nut and the head of the bolt when the assembly is put together. Thus, a portion of the wheel stud may extend beyond the head of the wheel nut. This space ensures that the bolt can tighten within its bore when it is rotated by the locking cap in response to loosening of the wheel nut.

Optionally, a pair of substantially orthogonal axial cuts can be made in the end of the stud distal from the wheel hub so as to define four segments. Thus, when the bolt is tightened, the stud will be caused to bulge slightly which helps to retain the wheel nut. This bulging can be further increased by manufacturing the bore and the bolt with a slight conical taper.

A second aspect of the invention lies in a method of converting a wheel stud for use in a wheel nut assembly of the first aspect of the invention.

Accordingly, it is within the envisaged scope of the invention to modify a set of wheel studs on a vehicle to accept the retaining member and/or locking means. For example, this could be done by drilling a bore into the end of the stud and tapping a suitable internal thread into the bore. Alternatively, the bore could be made by a spark erosion process.

It is also envisaged that the invention may comprise providing a kit of parts for converting the wheel nut assembly of a vehicle into a wheel nut assembly in accordance with the first aspect of the invention. The kit may comprise one or more of a stud, a locking means and a retaining member according to the first aspect of the invention.

According to a third aspect, the invention provides a lock assembly comprising a first locking portion having an internal bore adapted to receive one or more magnetic elements biased towards a first position substantially towards the axial centre of the bore by a resilient biasing means, and a second locking portion adapted to be received at least partially within the bore in said first portion and having a magnet receiving portion defined thereon into which said one or more magnets are biased to substantially prevent axial movement of the second portion relative to the first portion.

With the first portion and second portion interconnected in this way, the lock assembly is said to be "closed" or locked.

A lock releasing means may be provided which is adapted to apply a magnetic biasing force or field to the magnetic elements to retract at least some of the magnetic elements to a second position in which said second portion is free to move axially relative to the first portion. Thus, the lock can be "opened" using the lock releasing means.

The magnetic elements may be arranged in an annular groove provided around the inside of the bore, and the resilient biasing means may comprise one or more springs.

The magnetic elements may be arranged in the first portion so that an individual magnetic biasing force is required to release each magnetic element from the second portion. For example, the magnetic elements may be arranged so that one magnetic element needs to be attracted by a south pole placed against the first portion, whilst another may require a north pole. Thus, a lock combination can be built by varying the position and/or type of magnetic elements in the first portion. Only the correct arrangement of biasing force around the cap will therefore allow the first and second portions to be "opened".

In a refinement, two or more annular arrays of magnetic elements may be provided in the first portion. This increases the number of possible combinations.

In another refinement, the second portion may have a hollow bore provided therein which extends at least part way through the portion of the second portion located inside the bore in the first portion of the lock assembly. The magnetic elements in the first portion may be arranged so that a magnetic biasing force must be provided inside the bore in the second portion at the same time as a magnetic biasing force is applied outside the first portion to release the first and second portions. This may be achieved by arranging one or more of the magnetic elements in the first portion so that they are only released from the second portion when a magnet is inserted into the second portion through the bore.

The second portion may comprise a pin having a domed head and a shank which extends within a bore in the first portion.

There will now be described, by way of example only, several embodiments of the present invention, with reference to the following drawings in which:

FIG. 2 is an illustration of the assembly of FIG. 1 when fully assembled for use in retaining a wheel onto a hub;

FIG. 3(a) is a view along the axis of the wheel stud of the assembly of FIG. 1 and 3(b) is a similar view of a different assembly;

Figure 1:
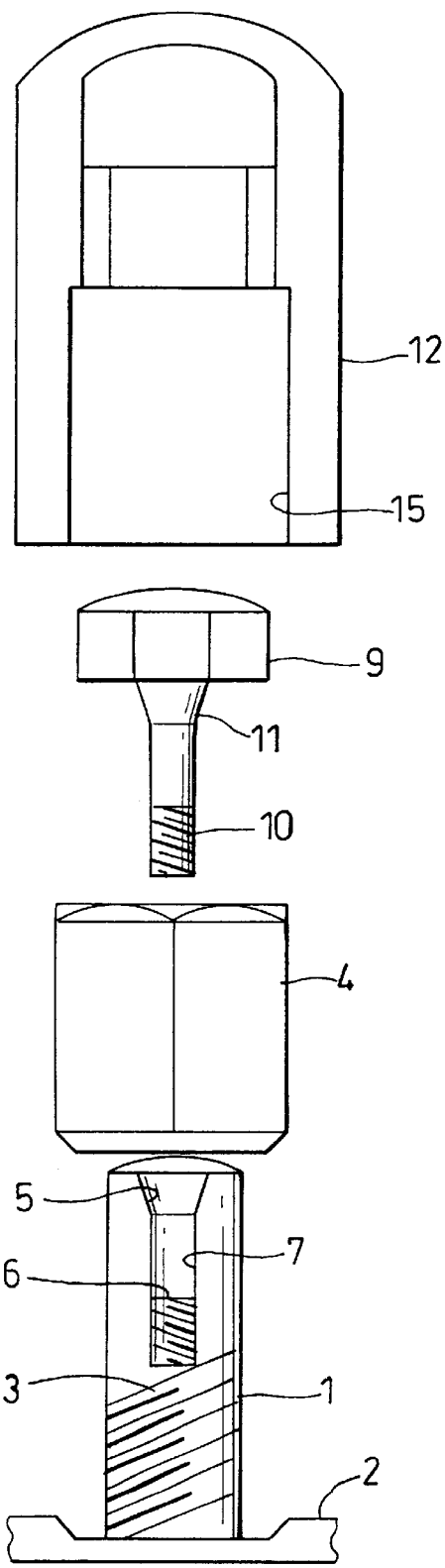
FIG. 1 is an exploded view of a wheel nut assembly in accordance with a first embodiment of the present invention.

A first embodiment of the present invention is shown in an exploded form in FIG. 1 of the accompanying drawings.

The wheel nut assembly comprises a stud 1 which is attached onto a hub 2. The stud can be welded in place. The stud has an external thread 3 provided over at least its lower portion proximal to the hub 2. A wheel nut 4 is adapted to threadedly engage with the stud 1 by means of an internal thread (not shown) which co-operates with the external thread 3 on the stud 1. The nut 4 may be tightened to the required torque and acts to trap a part of the vehicle wheel (not shown) onto the wheel hub 2.

The stud 1 is of greater length than the axial length of the nut 4 so that when the nut is correctly tightened onto the stud, an end portion of the stud 1 protrudes from the nut 4.

An internal bore 5 is provided in the end portion of the stud distal from the wheel hub 2. The bottom end of the bore (i.e. the portion furthest from its opening) is provided with a thread 6 which is of the opposite hand to the external thread 3. Optionally, the open end 7 of the bore is tapered so that the bore widens towards the opening. Also, two orthogonal cuts 8a, 8b can be made in the end of the stud so that the end portion containing the bore is split axially into four sections as shown in FIGS. 3(a) and (b).

A bolt 9 is provided which has a thread 10 that is complementary to the internal thread 6 in the bore 5. The bolt can be tightened into the bore 5 by engagement of thread 6 with thread 10 and turning the bolt in the opposite direction to that required to tighten the wheel nut 4. A portion 11 of the threaded stem of the bolt is tapered so that tightening of the bolt 9 pushes apart the four sections of the stud, effectively increasing the circumference at the top of the stud. This helps prevent accidental removal or loosening of the nut.

A locking means, in the form of a cap 12 is also provided. The locking cap is adapted to fit over the wheel nut 2 and retaining bolt 9 and clip in position under the head of the retaining bolt 9 to prevent accidental removal. On the inside of the cap, a stepped bore 15 is provided, the two parts of the bore being adapted so that the locking cap prevents relative rotational movement between the wheel nut 4 and the retaining bolt 9. Thus, if the wheel nut 4 rotates in a direction which will cause it to loosen on the stud, the retaining bolt 9 will tighten in its bore to prevent the wheel nut 4 working loose.

The complete assembly is shown in FIG. 2 of the drawings in a fully assembled position. As can be seen, the locking cap 12 prevents the ingress of dirt and water into the stud and nut which helps to prevent corrosion of the threaded parts.

FIGS. 3(a) and (b) show to possible profiles for the wheel nut 4 and retaining bolt 9 as seen along an axis when assembled. In FIG. 3(a) the wheel nut 4 and retaining bolt 9 have a standard hexagonal shape. Thus, when the locking cap 12 is fitted, the nut 4 and bolt 9 must be in one of six possible angular positions in order to fit into complementary shaped (i.e. hexagonal) bores within the locking cap.

In FIG. 3(b), a more complicated, multi-faceted profile is provided which allows the nut 4 and bolt 9 to adopt twelve possible positions within corresponding multi-faceted bores in the locking cap. This allows a more accurate level of torque to be set on tightening tightness of the assembly before fitting the locking cap 12. Of course, the bore in the cap may have twelve sides which would enable twelve positions of a hexagonal standard nut to be provided or more than twelve.

Figure 4A:
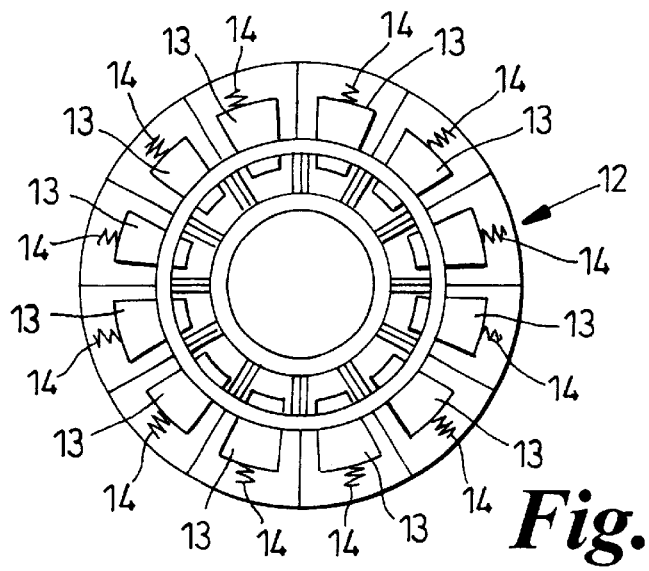
FIG. 4(a) shows an alternative locking cap arrangement and 4(b) shows the same cap from an alternative perspective.

FIG. 4(a) illustrates an axial view of an alternative locking cap arrangement which provides a measure of security. This could be useful to prevent theft of the wheels by removal of the cap and loosening the bolts and nuts.

The cap 12 is similar to the cap of the first embodiment in that it comprises a stepped internal bore which co-operates with the wheel nut 4 and retaining bolt 9 to prevent relative movement therebetween. However, an additional locking mechanism is provided which is adapted to prevent removal of the cap. The locking mechanism comprises a plurality of magnetic segments 13 which are arranged radially around the locking cap 12. The segments are each biased by a light spring 14 towards the centre of the cap. However, an alternative biasing means could be employed. It will be appreciated, of course, that the locking cap in at least a region proximal to the magnets should be non-magnetic or otherwise adapted so that it does not attract the magnetic segments.

Figure 4B:
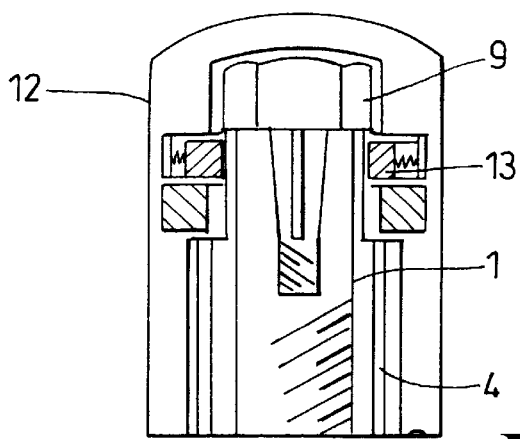

On assembly of the cap 12 onto the retaining bolt and wheel nut, the magnetic segments snap into position under the bolt head due to the biasing force of the springs, as shown in FIG. 4(*b*).

Figure 5:
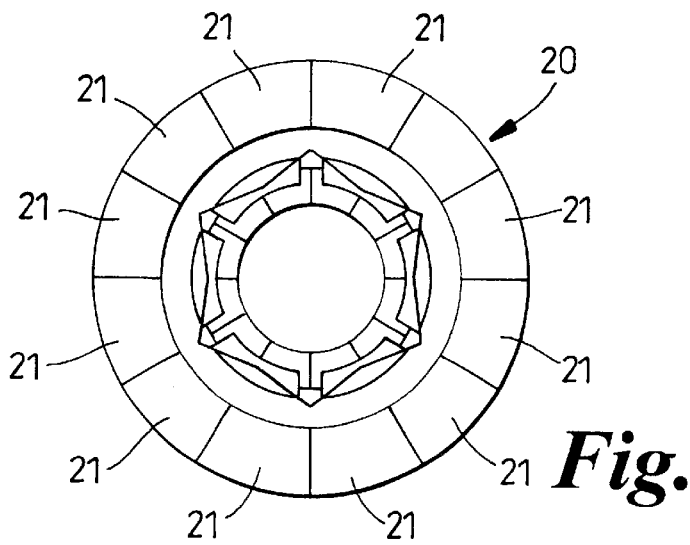
FIG. 5 shows the locking "key" in position around the locking cap.
Figure 6:
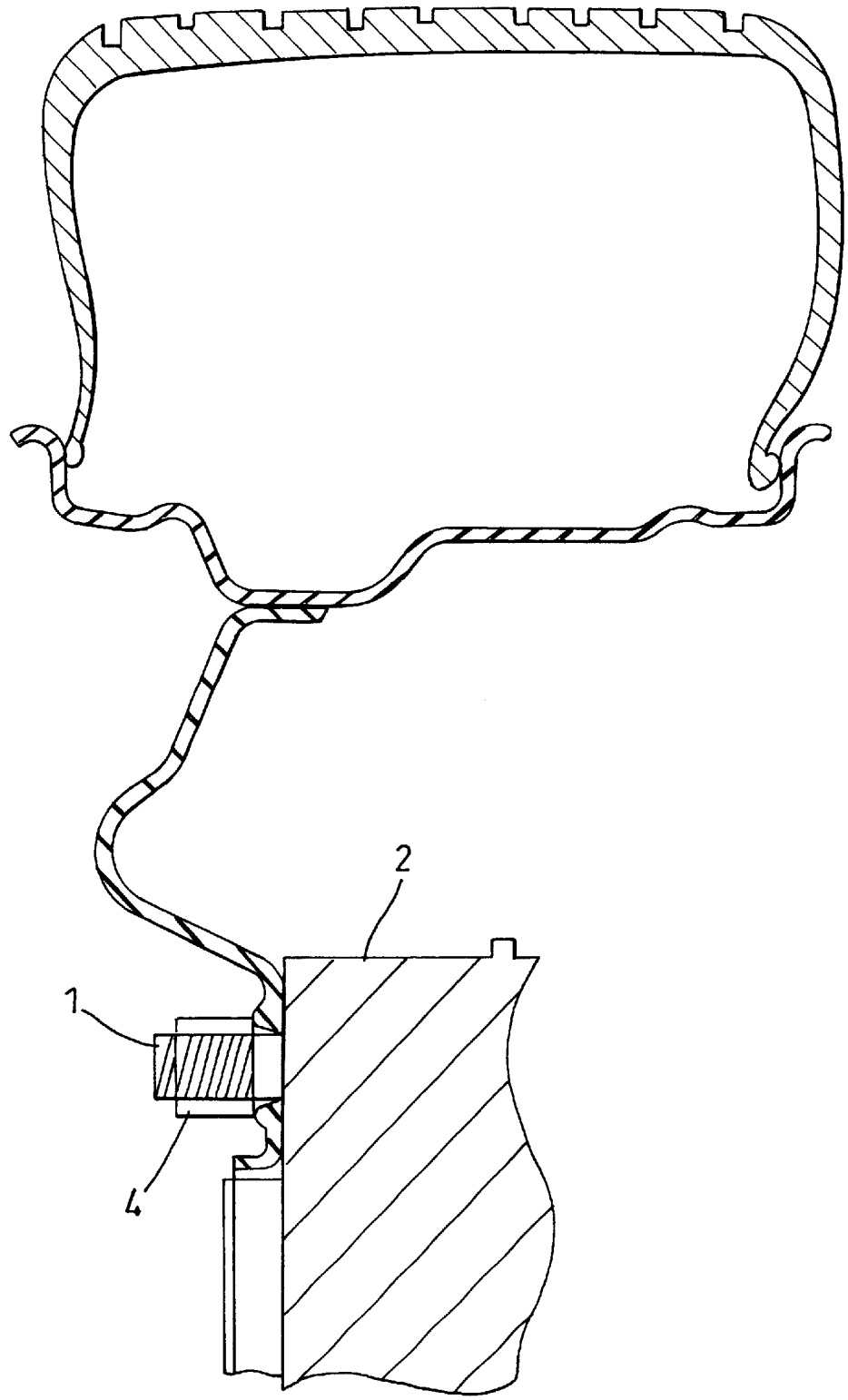
FIG. 6 shows the prior art method of mounting a wheel to a hub using a simple stud and wheel nut arrangement.

In order to remove the cap all the magnets must simultaneously be pulled away from the centre of the cap against the resistance of the biasing springs by use of a magnetic "key" 20. The magnetic "key", shown in position in FIG. 5 around the locking cap, comprises an annulus of magnetic segments 21, with each segment corresponding to a segment within the locking cap 12. In order to withdraw each of the magnets in the cap, the magnet in the locking "key" proximal to a segment must have an opposite polarity to produce an attractive force. Accordingly, by varying the polarity of the magnets in the cap, a large number of different combinations can be established. For example, if all the segments in the cap are arranged so that their north poles face the centre of the cap with their south pole facing outwards, the magnetic "key" must have segments arranged so they all have their north poles facing inwards to attract the segments in the cap.

Because the magnets can be sealed inside the cap, they cannot be removed by force and so the locking cap cannot be "picked" in the way that a normal mechanical lock could be. It is envisaged that twelve magnetic segments could be provided in the cap, but more or less segments may be used (i.e. from two to one hundred or more).

Figure 7:
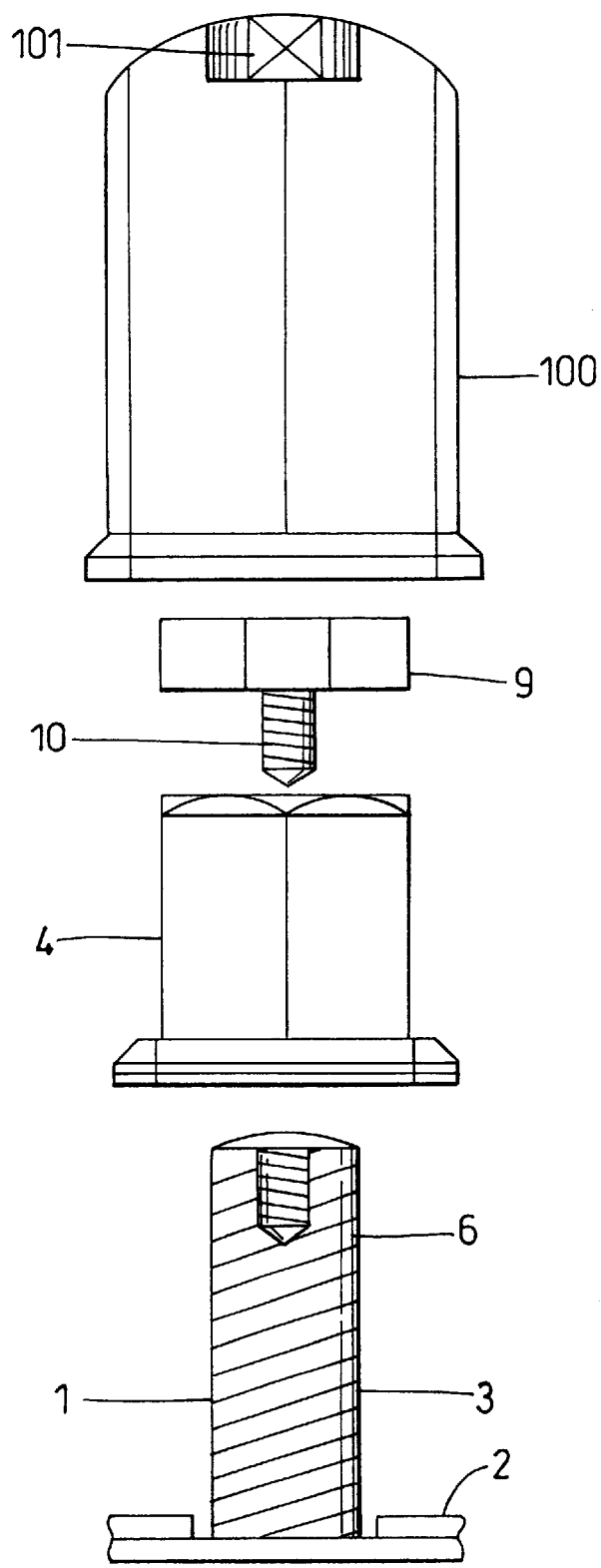
FIG. 7 shows a modification to the assembly of FIG. 1.

FIG. 7 shows a modification of the assembly of FIG. 1 in which the taper of the bore 7 has been omitted and the depth of the bore has been reduced. A bore depth of 10 mm or less has been found to be particularly suitable as tests have shown it to have no effect on the strength of the stud assembly under shear loads. The lock cap has been modified to have the appearance of an oversized hexagonal domed nut. The cap has flats around its outer surface to allow the cap to be rotated using a suitable tool, and when installed, gives the appearance of a "standard" bolt head. It can also be seen that the outside diameter of the nut 4 and the bolt 9 are the same. This allows the cap to be produced having a simple constant bore width along its length whilst engaging both the bolt and nut to prevent relative rotation there between.

Figure 8A:
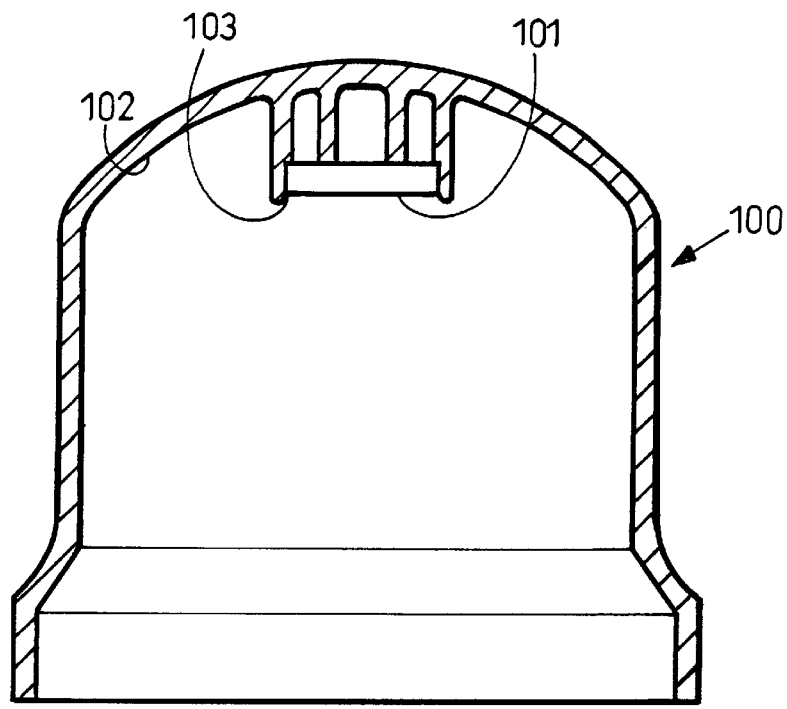
FIG. 8 shows an alternative design for the locking cap.
Figure 8B:
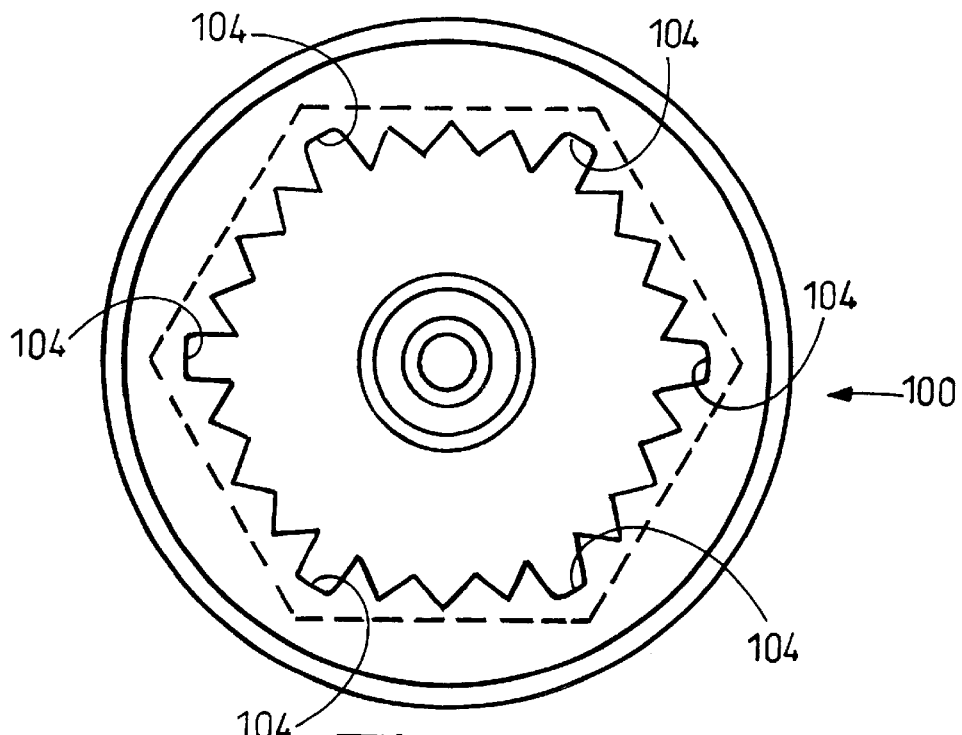

The cap 100 of FIG. 7 is shown in more detail in FIGS. 8(*a*) and 8(*b*). A magnet 101 is retained adjacent a top inside face 102 of the cap, which holds the cap onto the bolt in the stud. The magnet 101 can be located in the cap by knurling a portion 103 of the cap over the edges of the magnet 101. Also, the cap may be located on the nut and bolt in any one of 24 possible positions due to the multi-faceted profile of its inner face visible in FIG. 8(*b*). A further feature apparent from FIG. 8(*b*) is that material has been removed from portions 104 from the inside of the cap corresponding to the external corners. This has been found to be advantageous when the cap is made of plastic as it prevents shrinkage of the thicker wall material at the corners deforming the cap.

Figure 9:
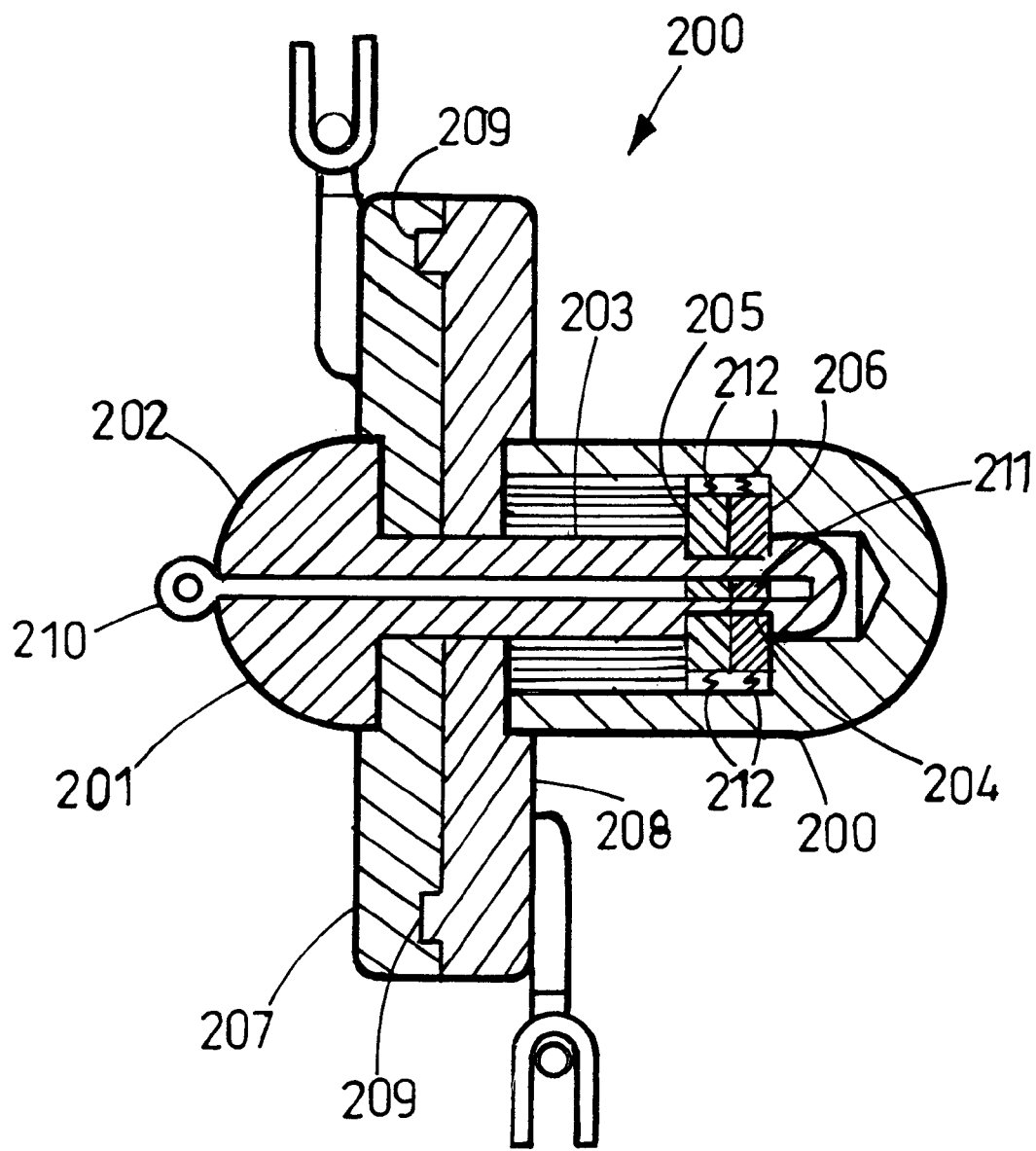
FIG. 9 shows a lock assembly of one aspect of the invention.

FIG. 9 shows an embodiment of a lock assembly which comprises a locking cap 200 similar to that shown in FIG. 4 which is adapted to co-operate with a pin 201 instead of a stud. The pin 201 has a domed head 202 and a shank 203 of smaller diameter than the head 202, defining a shoulder at the intersection of the head and the shank. The cap 200 includes a plurality of locking magnetic elements 205, 206 arranged radially around the inner face of the cap 200, each biased towards the cap centre axis by a resilient member such as a spring 212. The magnets 205, 206 are adapted to engage into a groove 204 around the shank of the pin with the pin held relative to the cap defining a gap into which two plates 207, 208 can be accommodated by passing the shank through an aperture in each plate before inserting into the cap. Thus, the magnets retain the pin in the cap which in turn traps the plates between the cap and the pin head.

To remove the pin 201 from the cap 200, all the magnets must be simultaneously biased away from the grooves in the shank. This can be achieved by placing a removal tool or key (similar to that described in relation to FIG. 4) around the cap. The tool (not shown) includes an annular array of magnets which attract the magnets in the cap. By varying the polarity of the magnets in the cap, a number of lock combinations can be generated, each requiring a unique removal tool to attract all the magnets from the pin.

As shown in FIG. 9, two annular arrays of magnets 205, 206 are provided which increases the number of combinations, although one annular ring, or more than two may be provided. Alternatively, just one, two or three randomly spaced magnetic elements could be provided.

FIG. 9 also shows an (optional) release tool in the form of a pick 210 which can be inserted into a passage through the centre of the pin. This pick is provided with one or more magnets 211 on an end portion which, when correctly aligned, exert a magnetic force upon one or more of the magnetic segments in the cap. This may provide further security, as the cap and pin can then not be parted unless the magnets on the pick are correctly aligned with the magnets on the cap, and at the same time the correct release tool is aligned correctly around the cap. The magnets on the pick, for example, may act to repel one or more magnetic segments in the cap away from the groove in the shank of the pin.

As shown in FIG. 9, the plates 207, 208 each form a part of a chain which can be used to lock an object in place, such as a bicycle. Lugs 209 in the plates co-operate with recesses in the plates to absorb axial loads to prevent the pin breaking under load.

Of course, many other security applications are envisaged for the locking cap assembly. Indeed, it is envisaged that the skilled man would appreciate that alternative lock assemblies which include magnetic segments arranged in a cap or equivalent and biased into engagement with a stud or pin or such like until released by a suitable magnetic tool fall within the scope of the present invention.

What is claimed is:

1. A wheel nut assembly comprising a wheel stud (1) and a wheel nut (4) for use in fixing a wheel to a vehicle hub (2) in which:

the wheel stud (1) comprises a first portion having a first external thread (3) which is adapted to co-operate with an internal thread provided on the wheel nut (4), a second threaded portion (6) having a second thread, one of the first external thread (3) and second thread being right handed and the other of the first external thread (3) and second thread being left handed, and further in which the second thread co-operates with a threaded retaining number (9), and where a locking member (12) is provided which is adapted to cooperate with the wheel nut (4) and the retaining member (9) to substantially prevent relative rotational movement between said wheel nut (4) and said retaining member (9).

2. A wheel nut assembly according to claim 1 in which the retaining member (9) comprises a threaded bolt and the stud (1) is provided with an internal bore (5) which defines the second threaded portion (6).

3. A wheel nut assembly according to claim 1 in which the retaining member (9) has an external diameter greater than the internal diameter greater than the internal diameter of the wheel nut (4).

4. A wheel nut assembly according to claim 1 in which a thread (10) on the retaining member (9) has a pitch which is greater than the pitch of the internal thread provided on the wheel nut (4).

5. A wheel nut assembly according to any one of claims 2–4 in which the locking member (12) comprises a locking cap which completely encloses the wheel nut (4) and the retaining member (9).

6. A wheel nut assembly according to claim 5 in which the locking member (12) is provided with a fastening member (13) adapted to retain the locking member (12) onto the stud (1).

7. A wheel nut assembly according to claim 6 in which the fastening member (13) comprises a magnet.

8. A wheel nut assembly according to claim 1 in which the shape of the wheel nut and the retaining member are adapted so that the locking member can only be put in position once the nut and retaining member are titghtened to a predetermined torque.

9. A locking assembly adapted to retain a threaded nut (4) in a substantially fixed position relative to a stud (1) with a first external thread (3), comprising a second threaded portion (6) of the stud, a retaining element (9) adapted to be threadedly engaged with the second threaded portion (6) having a second thread, wherein one of the first external thread (3) and second thread being right handed and the other of the first external thread (3) and second thread being left handed, and a locking member (12) adapted to engage both the threaded nut (4) and the retaining member (9) to prevent relative rotation therebetween.

10. A locking assembly according to claim 9 in which the locking member (12) comprises a cap adapted to enclose the nut (14) and the retaining member (9).

11. A locking assembly according to claim 10 in which the locking member (12) is held in place by a magnet.

12. A wheel nut assembly according to claim 2 in which the retaining member (9) has an external diameter greater than the internal diameter greater than the internal diameter of the wheel nut (4).

13. A wheel nut assembly according to claim 2 in which a thread (10) on the retaining member (9) has a pitch which is greater than the pitch of the internal thread provided on the wheel nut (4).

14. A wheel nut assembly according to claim 3 in which a thread (10) on the retaining member (9) has a pitch which is greater than the pitch of the internal thread provided on the wheel nut (4).

15. A wheel nut assembly according to claim 12 in which a thread (10) on the retaining member (9) has a pitch which is greater than the pitch of the internal thread provided on the wheel nut (4).

16. A wheel nut assembly according to claim 5 in which the locking means (12) is provided with a fastening means (13) adapted to retain the locking means (12) onto the wheel nut (4).

17. A wheel nut assembly according to claim 16 in which the fastening member (13) comprises a magnet.

18. A wheel nut assembly according to claim 5 in which the locking means (12) is provided with a fastening means (13) adapted to retain the locking means (12) onto the retaining member (9).

19. A wheel nut assembly according to claim 18 in which the fastening member (13) comprises a magnet.

* * * * *